US012573616B2

(12) United States Patent
Ryu et al.

(10) Patent No.: US 12,573,616 B2
(45) Date of Patent: Mar. 10, 2026

(54) POSITIVE ELECTRODE FOR SECONDARY BATTERY, METHOD OF MANUFACTURING THE SAME, AND LITHIUM SECONDARY BATTERY INCLUDING THE SAME

(71) Applicant: LG Energy Solution, Ltd., Seoul (KR)

(72) Inventors: Ji Hoon Ryu, Daejeon (KR); Song Yi Han, Daejeon (KR); Ki Won Sung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 825 days.

(21) Appl. No.: 17/784,241

(22) PCT Filed: May 7, 2021

(86) PCT No.: PCT/KR2021/005710
§ 371 (c)(1),
(2) Date: Jun. 10, 2022

(87) PCT Pub. No.: WO2021/225396
PCT Pub. Date: Nov. 11, 2021

(65) Prior Publication Data
US 2023/0044623 A1     Feb. 9, 2023

(30) Foreign Application Priority Data

May 8, 2020     (KR) ........................ 10-2020-0054986

(51) Int. Cl.
| | |
|---|---|
| *H01M 4/36* | (2006.01) |
| *H01M 4/02* | (2006.01) |
| *H01M 4/505* | (2010.01) |
| *H01M 4/525* | (2010.01) |
| *H01M 10/0525* | (2010.01) |
| *H01M 10/0567* | (2010.01) |

(52) U.S. Cl.
CPC ........... *H01M 4/366* (2013.01); *H01M 4/505* (2013.01); *H01M 4/525* (2013.01); *H01M 10/0525* (2013.01); *H01M 10/0567* (2013.01); *H01M 2004/028* (2013.01); *H01M 2300/0025* (2013.01)

(58) Field of Classification Search
CPC ...... H01M 4/366; H01M 4/505; H01M 4/525; H01M 4/131; H01M 4/1391; H01M 4/62; H01M 4/661; H01M 4/0404; H01M 4/0435; H01M 10/0525; H01M 10/0567; H01M 10/052; H01M 2004/028; H01M 2300/0025
See application file for complete search history.

(56) References Cited

U.S. PATENT DOCUMENTS

| | | | |
|---|---|---|---|
| 8,900,753 B2 | 12/2014 | Konishi et al. | |
| 2004/0202928 A1* | 10/2004 | Miyamoto ........ | H01M 10/0431 |
| | | | 429/246 |
| 2005/0238957 A1 | 10/2005 | Kim et al. | |
| 2008/0102369 A1 | 5/2008 | Sakata et al. | |
| 2010/0015521 A1 | 1/2010 | Kim | |
| 2010/0047694 A1 | 2/2010 | Chu et al. | |
| 2012/0251893 A1 | 10/2012 | Sakata et al. | |
| 2013/0280608 A1 | 10/2013 | Kim et al. | |
| 2013/0288119 A1 | 10/2013 | Kim et al. | |
| 2014/0178757 A1 | 6/2014 | Sakata et al. | |
| 2015/0093638 A1* | 4/2015 | Shiozaki ............. | H01M 50/414 |
| | | | 429/212 |
| 2016/0020467 A1* | 1/2016 | Sugita ................... | H01M 4/366 |
| | | | 429/209 |
| 2017/0069906 A1 | 3/2017 | Saka et al. | |
| 2018/0076463 A1 | 3/2018 | Sugita et al. | |
| 2019/0006669 A1 | 1/2019 | Park et al. | |
| 2019/0267612 A1 | 8/2019 | Zhang et al. | |

(Continued)

FOREIGN PATENT DOCUMENTS

| | | |
|---|---|---|
| CN | 101626098 A | 1/2010 |
| CN | 103515577 A | 1/2014 |

(Continued)

OTHER PUBLICATIONS

Johannes, K. F., Additives for High Performance Applications: Chemistry and Applications. Dec. 2016, pp. 47-144. John Wiley & Sons, Inc.

(Continued)

*Primary Examiner* — Matthew W Van Oudenaren

(74) *Attorney, Agent, or Firm* — Lerner David LLP

(57) ABSTRACT

Provided is a positive electrode for a secondary battery, which has a multi-layer structure including a first positive electrode active material layer and a second positive electrode active material layer, wherein the first positive electrode active material layer includes a first lithium composite transition metal oxide containing nickel, cobalt, and manganese, the second positive electrode active material layer includes a second lithium composite transition metal oxide containing nickel, cobalt, and manganese, the first lithium composite transition metal oxide and the second lithium composite transition metal oxide have mutually different nickel contents, wherein the positive electrode active material layer including a lithium composite transition metal oxide having a relatively high nickel content includes an electrolyte additive, and the positive electrode active material layer including a lithium composite transition metal oxide having a relatively low nickel content does not include an electrolyte additive.

10 Claims, No Drawings

(56)                References Cited

U.S. PATENT DOCUMENTS

| | | | |
|---|---|---|---|
| 2020/0127276 A1* | 4/2020 | Kim | H01M 4/131 |
| 2020/0203677 A1* | 6/2020 | Lee | H01M 10/0418 |
| 2020/0251714 A1 | 8/2020 | Ryu et al. | |
| 2021/0083280 A1 | 3/2021 | Guo et al. | |
| 2023/0146690 A1 | 5/2023 | Park et al. | |

FOREIGN PATENT DOCUMENTS

| | | | |
|---|---|---|---|
| CN | 109004175 A | | 12/2018 |
| CN | 111092194 A | | 5/2020 |
| JP | H09320569 A | | 12/1997 |
| JP | 2006080020 A | | 3/2006 |
| JP | 2007519186 A | | 7/2007 |
| JP | 2008108586 A | | 5/2008 |
| JP | 2009064715 A | | 3/2009 |
| JP | 2014067629 A | | 4/2014 |
| JP | 2015181093 A | | 10/2015 |
| JP | 2017054637 A | | 3/2017 |
| JP | 2017191651 A | | 10/2017 |
| JP | 2019029205 A | | 2/2019 |
| JP | 2019140039 A | | 8/2019 |
| KR | 20060045320 A | | 5/2006 |
| KR | 100892048 B1 | | 4/2009 |
| KR | 101050333 B1 | | 7/2011 |
| KR | 101477724 B1 | | 12/2014 |
| KR | 20150043769 A | | 4/2015 |
| KR | 20190003110 A | | 1/2019 |
| KR | 20190064462 A | | 6/2019 |
| KR | 20190088331 A | | 7/2019 |
| KR | 20190088333 A | | 7/2019 |
| KR | 20190124518 A | | 11/2019 |
| KR | 20200043612 A | | 4/2020 |
| WO | 2005078832 A1 | | 8/2005 |
| WO | 2014141695 A1 | | 9/2014 |
| WO | WO2019050356 | * | 3/2019 |
| WO | 2019208958 A1 | | 10/2019 |

OTHER PUBLICATIONS

International Search Report for Application No. PCT/KR2021/005710 mailed Aug. 18, 2021, pp. 1-4.
Extended European Search Report including Written Opinion for Application No. 21800590.8 dated Jun. 29, 2023, pp. 1-7.

* cited by examiner

POSITIVE ELECTRODE FOR SECONDARY BATTERY, METHOD OF MANUFACTURING THE SAME, AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2021/005710, filed May 7, 2021, which claims priority from Korean Patent Application No. 10-2020-0054986, filed on May 8, 2020, the disclosures of which are incorporated herein by reference in their entirety.

TECHNICAL FIELD

The present disclosure relates to a positive electrode for a secondary battery, a method of manufacturing the same, and a lithium secondary battery including the same.

BACKGROUND ART

Recently, in response to the rapid spread of electronic devices using batteries, such as mobile phones, notebook computers, electric vehicles, and the like, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for enhancing the performance of lithium secondary batteries have been continuously made.

Lithium secondary batteries generate electrical energy through oxidation and reduction reactions when lithium ions are intercalated/deintercalated into/from a positive electrode and a negative electrode while an organic electrolyte or a polymer electrolyte fills an empty space between a positive electrode and a negative electrode which consist of active materials enabling the intercalation and deintercalation of lithium ions. As positive electrode active materials for lithium secondary batteries, lithium transition metal oxides are used, and as negative electrode active materials, a lithium metal, a lithium alloy, crystalline or amorphous carbon, a carbon composite, and the like are used. Secondary batteries are manufactured by applying the active material onto an electrode current collector to an appropriate thickness and length or applying the active material itself in the form of a film, winding or laminating the same together with a separator, which is an insulator, to form an electrode group, placing the electrode group in a can or a container similar to the can, and injecting an electrolyte.

Since general lithium secondary batteries use a liquid electrolyte, the composition in the electrolyte is uniformly maintained. However, since the composition of the electrolyte is uniform even though the required electrolyte components are different depending on the positive electrode and the negative electrode, unnecessarily large amounts of a solvent and an electrolyte additive need to be used to satisfy the desired battery performance. In this case, the unnecessarily large amounts of a solvent and an electrolyte additive may result in an increase in side reactions and an increase in price due to an additional addition.

In addition, when the electrode is formed in a multi-layer structure and the type or composition of the electrode active material of each electrode layer varies to enhance the performance of lithium secondary batteries, since the type or composition of the electrode active material varies for each electrode layer even within the positive electrode (or negative electrode), an electrolyte component needs to vary to enhance battery performance, but there has been a problem that the composition of the electrolyte is uniformly applied.

RELATED-ART DOCUMENTS

Patent Documents (Patent Document 1) Japanese Laid-Open Patent Publication No. 1997-320569

DISCLOSURE

Technical Problem

The present disclosure is directed to providing a positive electrode for a secondary battery, which is capable of enhancing the high-temperature performance of a lithium secondary battery by varying an electrolyte component for each electrode layer in a positive electrode for a secondary battery, which has a multi-layer structure including several types of positive electrode active materials.

Technical Solution

One aspect of the present disclosure provides a positive electrode for a secondary battery, which has a multi-layer structure including a first positive electrode active material layer and a second positive electrode active material layer, wherein the first positive electrode active material layer includes a first lithium composite transition metal oxide containing nickel, cobalt, and manganese, the second positive electrode active material layer includes a second lithium composite transition metal oxide containing nickel, cobalt, and manganese, the first lithium composite transition metal oxide and the second lithium composite transition metal oxide have mutually different nickel contents, a positive electrode active material layer including a lithium composite transition metal oxide having a relatively high nickel content includes an electrolyte additive, and a positive electrode active material layer including a lithium composite transition metal oxide having a relatively low nickel content does not include an electrolyte additive.

Another aspect of the present disclosure provides a method of manufacturing the above-described positive electrode for a secondary battery, which includes: forming a first positive electrode slurry including a positive electrode active material consisting of a lithium composite transition metal oxide having a relatively high nickel content and an electrolyte additive and forming a second positive electrode slurry including a positive electrode active material consisting of a lithium composite transition metal oxide having a relatively low nickel content and no electrolyte additive; and applying the first positive electrode slurry and the second positive electrode slurry onto a positive electrode current collector in a multi-layer structure and performing drying and roll pressing.

Still another aspect of the present disclosure provides a lithium secondary battery which includes: the above-described positive electrode; a negative electrode disposed to face the positive electrode and including a negative electrode active material; a separator interposed between the positive electrode and the negative electrode; and an electrolyte impregnated into the positive electrode and the negative electrode, wherein an electrolyte additive is included only in an electrolyte in a positive electrode active material layer including a lithium composite transition metal oxide having a relatively high nickel content in the positive electrode.

Advantageous Effects

According to the present disclosure, since an electrolyte component varies for each electrode layer in a positive electrode for a secondary battery, which has a multi-layer structure including several types of positive electrode active materials, the high-temperature performance of a lithium secondary battery can be enhanced, gas generation can be reduced by suppressing the side reactions of an electrolyte, and an increase in resistance caused by an electrolyte additive can be minimized.

DETAILED DESCRIPTION OF THE PRESENT DISCLOSURE

Hereinafter, the present disclosure will be described in more detail and in various examples to facilitate understanding of the present disclosure. Terms and words used in this specification and claims should not be interpreted as being limited to commonly used meanings or meanings in dictionaries, and, based on the principle that the inventors can appropriately define concepts of terms in order to describe exemplary illustrations of their invention in the best way, as desired, the terms and words should be interpreted with meanings and concepts which are consistent with the technological spirit of the present disclosure. To that end, the particular described embodiments and examples are for illustration only and the present disclosure should not be considered to be limited to such embodiments and examples herein.

<Positive Electrode for Secondary Battery and Manufacturing Method Thereof>

The present disclosure provides a positive electrode for a secondary battery, which has a multi-layer structure including a first positive electrode active material layer and a second positive electrode active material layer, wherein the first positive electrode active material layer includes a first lithium composite transition metal oxide containing nickel, cobalt, and manganese, the second positive electrode active material layer includes a second lithium composite transition metal oxide containing nickel, cobalt, and manganese, the first lithium composite transition metal oxide and the second lithium composite transition metal oxide have mutually different nickel contents, wherein the particular positive electrode active material layer including a lithium composite transition metal oxide having a relatively high nickel content includes an electrolyte additive, and the other positive electrode active material layer including a lithium composite transition metal oxide having a relatively low nickel content does not include an electrolyte additive.

An electrolyte additive used in a lithium secondary battery mainly serves to reduce gas generation by suppressing the side reactions of an electrolyte on a positive electrode surface, enhance low-temperature output by increasing ion conductivity, reduce resistance, and suppress the elution of transition metals by protecting the interface of a positive electrode. However, the use of an excessive amount of an electrolyte additive may have an adverse effect, such as an increase in resistance.

Conventionally, since the composition in a liquid electrolyte is uniform even though the electrolyte components required according to a composition of each layer of an electrode with a multi-layer structure differ, unnecessarily large amounts of a solvent and an electrolyte additive need to be used to satisfy battery performance, leading to an increase in side reactions of an electrolyte or an increase in resistance.

In order to solve the above problem, in the present disclosure, varying electrolyte additives are applied according to characteristics of a positive electrode active material of each layer in an electrode for a secondary battery which has a multi-layer structure. Specifically, in an electrode for a secondary battery which has a multi-layer structure including, in respective layers, two types of positive electrode active materials having varying nickel contents in a lithium composite transition metal oxide containing nickel, cobalt, and manganese, since a lithium composite transition metal oxide having a relatively high nickel content is highly reactive with an electrolyte, an electrolyte additive is included in the positive electrode active material layer including a positive electrode active material consisting of the lithium composite transition metal oxide having a relatively high nickel content and is not included in the positive electrode active material layer including a positive electrode active material consisting of a lithium composite transition metal oxide having a relatively low nickel content.

Therefore, it is possible to enhance the high-temperature performance of a lithium secondary battery, reduce gas generation by suppressing the side reactions of an electrolyte, and minimize an increase in resistance.

According to an embodiment of the present disclosure, the first lithium composite transition metal oxide may have a nickel content accounting for 60 mol % or more of metals excluding lithium, and the second lithium composite transition metal oxide may have a lower nickel content than the first lithium composite transition metal oxide. Further, the first positive electrode active material layer may include an electrolyte additive, and the second positive electrode active material layer may not include an electrolyte additive. When the nickel content of the lithium composite transition metal oxide is 60 mol % or more, a lithium secondary battery can ensure high capacity.

More preferably, the first lithium composite transition metal oxide may have a nickel content accounting for 80 mol % or more of metals excluding lithium, and the second lithium composite transition metal oxide may have a lower nickel content than the first lithium composite transition metal oxide (i.e., have a nickel content of 33 to 75 mol %). When the nickel content of the first lithium composite transition metal oxide is 80 mol % or more, a lithium secondary battery can ensure higher capacity.

The first and second lithium composite transition metal oxides may each be independently represented by the following Chemical Formula 1.

$$Li_aNi_{1-b-c-d}Co_bMn_cQ_dO_{2+\delta} \qquad \text{[Chemical Formula 1]}$$

In Chemical Formula 1, Q is at least one element selected from the group consisting of Al, Si, B, W, Mo, Mg, V, Ti, Zn, Ga, In, Ru, Nb, Ta, Sn, Sr, La, Ce, Pr, and Zr, and $0.9 \leq a \leq 1.5$, $0 < b < 1.0$, $0 < c < 1.0$, $0 \leq d \leq 0.1$, $0 < b+c+d < 1.0$, and $-0.1 \leq \delta \leq 1.0$ are satisfied.

In the positive electrode for a secondary battery according to the present disclosure, which has a multi-layer structure including a first positive electrode active material layer and a second positive electrode active material layer, the order of the first and second positive electrode active material layers is not limited. For example, the first positive electrode active material layer (including a first lithium composite transition metal oxide having a relatively high nickel content) may be formed on a positive electrode current collector, and the second positive electrode active material layer (including a second lithium composite transition metal oxide having a relatively low nickel content) may be formed on the first positive electrode active material layer. As another example, the second positive electrode active material layer (including a second lithium composite transition metal oxide having a relatively low nickel content) may be formed on a positive electrode current collector, and the first positive electrode active material layer (including a first lithium composite transition metal oxide having a relatively high nickel content) may be formed on the second positive electrode active material layer. In addition, the first and second positive electrode active material layers do not need to be formed adjacent to each other and may be formed so that other positive electrode active material layers including different types of positive electrode active materials or having different compositions are further included to be adjacent to the first and second positive electrode active material layers.

The positive electrode current collector is not particularly limited as long as it does not cause a chemical change in the battery and has conductivity. For example, stainless steel, aluminum, nickel, titanium, fired carbon, aluminum or stainless steel whose surface has been treated with carbon, nickel, titanium, silver, or the like, or the like may be used as the positive electrode current collector. In addition, the positive electrode current collector may typically have a thickness of 3 μm to 500 μm and have fine irregularities formed on the surface thereof to increase the adhesion of the positive electrode active material. Additionally, the positive electrode current collector may be used in any of various forms such as a film, a sheet, a foil, a net, a porous material, a foam, a non-woven fabric, and the like.

As the electrolyte additive, any electrolyte additive generally used in a lithium secondary battery may be used without limitation as long as it is present in a solid state at room temperature. For example, the electrolyte additive may be at least one selected from the group consisting of succinonitrile (SN), ethylene carbonate (EC), polyethylene glycol (PEG), and cyclic phosphate (CP). In this case, polyethylene glycol (PEG) may have a molecular weight of 1,000 or more, and succinonitrile (SN) is more preferably used for the purpose of reducing gas generation by suppressing the side reactions of an electrolyte. Succinonitrile (SN) is commonly used, particularly, in small-sized batteries requiring high voltage, is also applicable to most batteries, and has no impurities.

The electrolyte additive may be included in an amount of 0.1 to 5 parts by weight, preferably 1 to 3 parts by weight, and more preferably 1.5 to 2 parts by weight with respect to 100 parts by weight of the first positive electrode active material layer (including a first lithium composite transition metal oxide having a relatively high nickel content). When the electrolyte additive is included within the above-described range, the side reactions of an electrolyte are suppressed, and thus gas generation can be effectively reduced, and an increase in resistance can be suppressed.

The first and second positive electrode active material layers may include a conductive material and a binder in addition to the positive electrode active material.

The conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof. The conductive material may be typically included in an amount of 1 to 30 wt % with respect to the total weight of the positive electrode active material layer.

The binder serves to improve cohesion between positive electrode material particles and adhesion between the positive electrode active material and the positive electrode current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), a sulfonated EPDM, styrene butadiene rubber (SBR), fluoro rubber, and various copolymers thereof, which may be used alone or in combination of two or more thereof. The binder may be included in an amount of 1 to 30 wt % with respect to the total weight of the positive electrode active material layer.

Next, a method of manufacturing a positive electrode for a secondary battery according to the present disclosure will be described.

The positive electrode for a secondary battery according to the present disclosure is manufactured by forming a first positive electrode slurry including a positive electrode active material consisting of a lithium composite transition metal oxide having a relatively high nickel content and an electrolyte additive, forming a second positive electrode slurry including a positive electrode active material consisting of a lithium composite transition metal oxide having a relatively low nickel content and no electrolyte additive, applying the first positive electrode slurry and the second positive electrode slurry onto a positive electrode current collector in a multi-layer structure, and performing drying and roll pressing. According to an embodiment of the present disclosure, a positive electrode may be manufactured by applying the first positive electrode slurry onto a positive electrode current collector, drying the same, applying the second positive electrode slurry thereon, and performing drying and roll pressing.

The first and second positive electrode slurries may optionally further include a binder and a conductive material. The types and contents of the binder and the conductive material are the same as those described for the positive electrode for a secondary battery.

The first and second positive electrode slurries may be prepared by dissolving or dispersing a positive electrode active material consisting of a lithium composite transition metal oxide (and an electrolyte additive) in a solvent. The solvent may be any solvent generally used in the art, and examples thereof include dimethyl sulfoxide (DMSO), isopropyl alcohol, N-methyl pyrrolidone (NMP), acetone, water, and the like, which may be used alone or in combination of two or more thereof. The solvent is used in an amount just enough to dissolve or disperse a positive electrode active material (and an electrolyte additive), an optional conductive material and an optional binder and to have a viscosity capable of achieving excellent thickness uniformity upon subsequent application for manufacturing a positive electrode in consideration of a thickness of an applied slurry and a manufacturing yield. An electrolyte additive, particularly, succinonitrile (SN), may be dissolved in a solvent (e.g., NMP) to be uniformly dispersed in a liquid state in a positive electrode slurry. The solvent (e.g., NMP) used in the application and drying of the positive electrode slurry is volatilized and removed. However, the electrolyte additive (e.g., SN) is not volatilized but remains and thus may be uniformly distributed in a solid state in the positive electrode active material layer at room temperature after being dried. In the case of an electrolyte additive (e.g., SN) having a low melting point (about 57° C.), since the electrolyte additive is present as a waxy solid at room temperature, it does not affect the properties of an electrode, and when an electrolyte is injected in a cell assembly process for the electrolyte additive to encounter the electrolyte, the electrolyte additive is changed into a liquid state within a few seconds.

In the preparation of the first positive electrode slurry, the amount of the electrolyte additive may be adjusted to easily adjust the concentration of the electrolyte additive in the electrode to the desired extent and to reduce the total usage amount of the electrolyte additive. In addition, varying electrolyte additives may be applied according to characteristics of a positive electrode active material of each layer in an electrode for a secondary battery, which has a multi-layer structure, without the addition of a specific device or changes in the manufacturing process of a positive electrode.

<Lithium Secondary Battery>

Still another aspect of the present disclosure provides an electrochemical device including the above-described positive electrode. The electrochemical device may specifically be a battery, a capacitor, or the like, and more specifically, a lithium secondary battery.

The lithium secondary battery specifically includes the positive electrode according to the present disclosure, a negative electrode disposed to face the positive electrode, a separator interposed between the positive electrode and the negative electrode, and an electrolyte impregnated into the positive electrode and the negative electrode, wherein the positive electrode has been described above, and an electrolyte additive is included only in an electrolyte in a positive electrode active material layer including a lithium composite transition metal oxide having a relatively high nickel content in the positive electrode. Also, the lithium secondary battery may optionally further include: a battery container which accommodates an electrode assembly including the positive electrode, negative electrode, and separator; and a sealing member which seals the battery container.

In the lithium secondary battery, the negative electrode includes a negative electrode current collector and a negative electrode active material layer disposed on the negative electrode current collector.

The negative electrode current collector is not particularly limited as long as it does not cause a chemical change in the battery and has high conductivity. For example, copper, stainless steel, aluminum, nickel, titanium, fired carbon, copper or stainless steel whose surface has been treated with carbon, nickel, titanium, silver, or the like, an aluminum-cadmium alloy, or the like may be used as the negative electrode current collector. In addition, the negative electrode current collector may typically have a thickness of 3 μm to 500 μm and have fine irregularities formed on the surface thereof to increase the adhesion of a negative electrode active material like the positive electrode current collector. Additionally, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material. For example, the negative electrode active material layer may be formed by applying a composition for forming a negative electrode, which includes a negative electrode active material and, optionally, a binder and a conductive material, onto a negative electrode current collector and then drying the same, or by laminating, on a negative electrode current collector, a film obtained by casting the composition for forming a negative electrode on a separate support and removing it from the support.

As the negative electrode active material, a compound that enables the reversible intercalation and deintercalation of lithium may be used. Specific examples of the negative electrode active material include: a carbonaceous material such as artificial graphite, natural graphite, graphitized carbon fiber, amorphous carbon, or the like; a metallic substance capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta$ ($0<\beta<2$), $SnO_2$, vanadium oxide, or lithium vanadium oxide; and a composite including the metallic substance and the carbonaceous material, such as a Si—C composite or a Sn—C composite, which may be used alone or in combination of two or more thereof. In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature fired carbon such as petroleum or coal tar pitch-derived cokes, and the like.

In addition, the binder and the conductive material are the same as those described for the positive electrode.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte used in the present disclosure, an organic liquid electrolyte, an inorganic liquid electrolyte, or the like, which is usable in the manufacture of a lithium secondary battery, may be used, but the present disclosure is not limited thereto.

Specifically, the electrolyte may include an organic solvent and a lithium salt.

As the organic solvent, any solvent that functions as a medium through which ions involved in an electrochemical reaction of the battery can migrate may be used without particular limitation. Specifically, the organic solvent may be: an ester-based solvent such as methyl acetate, ethyl acetate, $\gamma$-butyrolactone, $\varepsilon$-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound that is capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used at a concentration of 0.1 to 2.0 M. When the concentration of the lithium salt is within the above-described range, the electrolyte has appropriate levels of conductivity and viscosity, and thus excellent electrolyte performance can be exhibited, and lithium ions can effectively migrate.

Since the lithium secondary battery including the positive electrode material according to the present disclosure stably exhibits excellent discharge capacity, excellent output characteristics, and an excellent capacity retention rate, it is useful in the field of portable devices such as mobile phones, notebook computers, digital cameras, and the like and electric vehicles such as hybrid electric vehicles (HEVs) and the like.

Accordingly, yet another aspect of the present disclosure provides a battery module including the lithium secondary battery as a unit cell and a battery pack including the battery module.

The battery module or battery pack may be used as a power source for one or more medium-to-large-sized devices selected from power tools; electric cars including electric vehicles (EVs), hybrid electric vehicles, and plug-in hybrid electric vehicles (PHEVs); and systems for storing electric power.

Hereinafter, the present disclosure will be described in detail with reference to examples so that those skilled in the art can easily carry out the present disclosure. However, the present disclosure may be embodied in several different forms, and therefore, is not limited to the examples described herein.

Example 1

$LiNi_{0.8}Co_{0.1}Mn_{0.1}O_2$ as a first lithium composite transition metal oxide, carbon black as a conductive material, and PVdF as a binder were mixed in a weight ratio of 96:2:2 in an N-methyl pyrrolidone solvent, and succinonitrile (SN) was mixed in an amount of 2 parts by weight with respect to 100 parts by weight of the sum of the first lithium composite transition metal oxide, carbon black conductive material, and PVdF binder to prepare a first positive electrode slurry.

$LiNi_{0.6}Co_{0.2}Mn_{0.2}O_2$ as a second lithium composite transition metal oxide, carbon black as a conductive material, and PVdF as a binder were mixed in a weight ratio of 96:2:2 in an N-methyl pyrrolidone solvent to prepare a second positive electrode slurry.

The first positive electrode slurry was applied onto one surface of an aluminum current collector and dried at 130° C., and the second positive electrode slurry was applied onto the first positive electrode slurry, dried at 130° C., and then roll-pressed to manufacture a positive electrode.

Example 2

A positive electrode was manufactured in the same manner as in Example 1, except that succinonitrile (SN) was mixed in an amount of 1 part by weight in the preparation of a first positive electrode slurry.

Example 3

A positive electrode was manufactured in the same manner as in Example 1, except that succinonitrile (SN) was mixed in an amount of 3 parts by weight in the preparation of a first positive electrode slurry.

Comparative Example 1

A positive electrode was manufactured in the same manner as in Example 1, except that 2 parts by weight of succinonitrile (SN) was not mixed in the preparation of a first positive electrode slurry.

Comparative Example 2

A positive electrode was manufactured in the same manner as in Example 1, except that succinonitrile (SN) was mixed in an amount of 1 part by weight in the preparation of a first positive electrode slurry, and succinonitrile (SN) was mixed in an amount of 1 part by weight with respect to 100 parts by weight of the sum of the second lithium composite transition metal oxide, carbon black conductive material, and PVdF binder in the preparation of a second positive electrode slurry.

Comparative Example 3

A positive electrode was manufactured in the same manner as in Example 1, except that 2 parts by weight of succinonitrile (SN) was not mixed in the preparation of a first positive electrode slurry, and succinonitrile (SN) was mixed in an amount of 2 parts by weight with respect to 100 parts by weight of the sum of the second lithium composite transition metal oxide, carbon black conductive material, and PVdF binder in the preparation of a second positive electrode slurry.

Experimental Example 1: High-Temperature Lifetime Characteristics

As a positive electrode, each of the positive electrodes manufactured in Examples 1 to 3 and Comparative Examples 1 to 3 was used.

A negative electrode was manufactured by mixing artificial graphite, carbon black as a conductive material, and PVdF as a binder in a weight ratio of 96:1:3 in an N-methyl pyrrolidone solvent to prepare a negative electrode mixture and applying the mixture onto one surface of a copper current collector, followed by drying at 120° C. and roll pressing.

A porous polyethylene separator was interposed between the manufactured positive electrode and negative electrode to manufacture an electrode assembly, the electrode assembly was placed inside a case, and an electrolyte was injected into the case to manufacture a lithium secondary battery. In this case, the electrolyte was prepared by dissolving 1.0 M lithium hexafluorophosphate (LiPF$_6$) in an organic solvent containing ethylene carbonate, ethyl methyl carbonate, and diethyl carbonate (EC/EMC/DEC volumetric mixing ratio=3/4/3).

In addition, a lithium secondary battery was manufactured using the positive electrode manufactured in Comparative Example 1 as a positive electrode and an electrolyte prepared by dissolving 1.0 M lithium hexafluorophosphate (LiPF$_6$) and 1 part by weight (with respect to 100 parts by weight of a positive electrode active material layer) of succinonitrile (SN) as an electrolyte additive in an organic solvent containing ethylene carbonate, ethyl methyl carbonate, and diethyl carbonate (EC/EMC/DEC volumetric mixing ratio=3/4/3) (Comparative Example 4).

Each manufactured lithium secondary battery (monocell) was charged at 45° C. in the CC/CV mode of 0.2 C up to 4.2 V, discharged in the CC mode of 0.2 C up to 2.5 V, then charged at 45° C. in the CC/CV mode of 0.5 C up to 4.2 V, and discharged at a constant current of 0.5 C up to 2.5 V, and the capacity retention rate when the charging/discharging experiment was performed 100 times was measured. Results thereof are shown in the following Table 1.

TABLE 1

|  | Capacity retention rate (%) |
| --- | --- |
| Example 1 | 97.1 |
| Example 2 | 96.7 |
| Example 3 | 92.6 |
| Comparative Example 1 | 88.7 |
| Comparative Example 2 | 90.8 |
| Comparative Example 3 | 89.6 |
| Comparative Example 4 | 89.1 |

Referring to Table 1, it can be seen that Examples 1 to 3 exhibited substantially improved high-temperature lifetime characteristics compared to Comparative Examples 1 to 4.

Experimental Example 2: Evaluation of Gas Generation and Resistance after High-Temperature Storage Each lithium secondary battery (monocell according to Examples 1 to 3 and Comparative Examples 1 to 4) manufactured using each of the positive electrodes of Examples 1 to 3 and Comparative Examples 1 to 3 as in Experimental Example 1 was charged at 25° C. in the CC/CV mode of 0.7 C up to 4.2 V (end current ½0C) and stored at a high temperature of 60° C. for 4 weeks, and then the volume variation thereof was measured to evaluate a gas generation amount. In addition, the cell was subjected to charging and discharging 3 times at room temperature at a constant current of 0.5 C within the range of 4.2 V to 3.0 V to 50% SOC after 4-week storage at 60° C., and the voltage drop/applied current generated when the cell was discharged at 2.5 C for 10 seconds was obtained to measure a resistance increase rate. Results thereof are shown in Table 2.

TABLE 2

|  | Gas generation amount (ml) | Resistance increase rate (%) |
| --- | --- | --- |
| Example 1 | 5.68 | 4.31 |
| Example 2 | 5.89 | 4.82 |
| Example 3 | 7.35 | 6.89 |
| Comparative Example 1 | 10.3 | 11.2 |
| Comparative Example 2 | 8.85 | 7.58 |
| Comparative Example 3 | 9.73 | 10.35 |
| Comparative Example 4 | 9.58 | 10.21 |

Referring to Table 2, it can be seen that Examples 1 to 3 exhibited substantially reduced gas generation amounts and substantially decreased resistance increase rates after high-temperature storage compared to Comparative Examples 1 to 4.

The invention claimed is:

1. A positive electrode for a secondary battery, comprising a multi-layer structure including a first positive electrode active material layer and a second positive electrode active material layer, wherein the first positive electrode active material layer includes a first lithium composite transition metal oxide containing nickel, cobalt, and manganese, the second positive electrode active material layer includes a second lithium composite transition metal oxide containing nickel, cobalt, and manganese, the first lithium composite transition metal oxide having a first nickel content and the second lithium composite transition metal oxide having a second nickel content, wherein the first nickel content is different from the second nickel content, wherein the positive electrode active material layer including a lithium composite transition metal oxide having a higher nickel content of the first nickel content and the second nickel content includes an electrolyte additive, and the positive electrode active material layer including a lithium composite transition metal oxide having a lower nickel content of the first nickel content and the second nickel content does not include an electrolyte additive, wherein the electrolyte additive is included in the first positive electrode active material layer in an amount of 1 to 2 parts by weight with respect to 100 parts by weight of the first positive electrode active material layer, and wherein the electrolyte additive is at least one selected from the group consisting of succinonitrile (SN), ethylene carbonate (EC), polyethylene glycol (PEG), and cyclic phosphate (CP).

2. The positive electrode of claim 1, wherein the first lithium composite transition metal oxide has the first nickel content accounting for 60 mol % or more of metals excluding lithium, the second lithium composite transition metal oxide has the second nickel content lower than the first lithium composite transition metal oxide, the first positive electrode active material layer includes the electrolyte additive, and the second positive electrode active material layer does not include an electrolyte additive.

3. The positive electrode of claim 1, wherein the electrolyte additive is succinonitrile (SN).

4. The positive electrode of claim 2, wherein the first lithium composite transition metal oxide has a nickel content accounting for 80 mol % or more of metals excluding lithium.

5. The positive electrode of claim 2, wherein the first positive electrode active material layer is formed on a positive electrode current collector, and the second positive electrode active material layer is formed on the first positive electrode active material layer, or the second positive electrode active material layer is formed on a positive electrode current collector, and the first positive electrode active material layer is formed on the second positive electrode active material layer.

6. A method of manufacturing the positive electrode for a secondary battery according to claim 1, comprising:

forming a first positive electrode slurry including the lithium composite transition metal oxide having the first nickel content and an electrolyte additive, and forming a second positive electrode slurry including the lithium composite transition metal oxide having the second nickel content and no electrolyte additive; and applying the first positive electrode slurry and the second positive electrode slurry onto a positive electrode current collector in a multi-layer structure and performing drying and roll pressing.

7. A lithium secondary battery comprising:

the positive electrode according to claim 1;

a negative electrode disposed to face the positive electrode and including a negative electrode active material;

a separator interposed between the positive electrode and the negative electrode; and an electrolyte impregnated into the positive electrode and the negative electrode, wherein, in the positive electrode, an electrolyte additive is included only in an electrolyte in a positive electrode active material layer including a lithium composite transition metal oxide having the higher nickel content of the first nickel content and the second nickel content.

8. The positive electrode of claim 1, wherein the electrolyte additive is at least two selected from the group consisting of succinonitrile (SN), ethylene carbonate (EC), polyethylene glycol (PEG), and cyclic phosphate (CP).

9. The positive electrode of claim 8, wherein the electrolyte additive includes succinonitrile (SN).

10. The positive electrode of claim 1, wherein the electrolyte additive consists essentially of succinonitrile (SN).

* * * * *